United States Patent [19]

Hotine

[11] 4,265,262
[45] May 5, 1981

[54] FLUENT MATERIAL LEVEL CONTROL SYSTEM

[76] Inventor: William Hotine, Box 216, Albion, Calif. 95410

[21] Appl. No.: 21,906

[22] Filed: Mar. 19, 1979

[51] Int. Cl.³ ............................................. F17D 3/00
[52] U.S. Cl. ..................... 137/2; 73/304 R; 137/392; 307/118; 361/178; 417/36; 417/44
[58] Field of Search ................ 417/36, 44, 45; 340/620; 361/178; 307/118; 137/2, 386, 392; 73/304 R, 304 C

[56] References Cited

U.S. PATENT DOCUMENTS

| | | | |
|---|---|---|---|
| 3,131,335 | 4/1964 | Berglund | 361/178 |
| 3,657,556 | 4/1972 | Foster | 73/304 R |
| 3,671,142 | 6/1972 | Calabrese | 340/620 |
| 3,741,683 | 6/1973 | McTamaney et al. | 137/392 |
| 3,787,733 | 1/1974 | Peters | 340/620 |
| 3,882,967 | 5/1975 | Gulla | 137/392 |
| 3,916,213 | 10/1975 | Luteran | 340/620 |
| 3,978,464 | 8/1976 | Miesterfeld | 340/620 |
| 4,001,676 | 1/1977 | Hile et al. | 340/620 |
| 4,112,318 | 9/1978 | Hamelink | 340/620 |
| 4,171,932 | 10/1979 | Miller | 417/36 |

Primary Examiner—Martin P. Schwadron
Assistant Examiner—G. L. Walton

[57] ABSTRACT

A system for sensing and controlling the level of fluent material in a reservoir or other receptacle. In electrically conducting materials levels are sensed by low voltage direct current conduction between electrode pairs placed at desired "high" and "low" control levels which send D.C. digital logic sensing signals over connecting wires to very high resistance "high" and "low" inputs of a digital logic signal processing circuit, while nonconducting material levels are sensed by suitable transducers which upon immersion can send D.C. digital logic signals. The digital signal processing circuit receives the sensor signals and provides a digital output signal or absence thereof, depending on the relative state and sequence of the sensing signals and transmits a digital output signal to a solid state relay which controls the power of flow control means to maintain desired levels of the fluent material.

6 Claims, 6 Drawing Figures

FLUENT MATERIAL LEVEL CONTROL SYSTEM

BACKGROUND OF THE INVENTION

Previous control systems of the analog type required the use of components such as moving parts, bridge circuits, moving contacts, electro-mechanical relays, and conductive containers, and have not been isolated from the power line. Their performance, safety, reliability and usefulness has been limited as a result.

Whereas analog control systems depend on accurate measurement of critical voltage levels and are subject to error and noise, digital control devices use signals or no signal, in digital parlance "one" which is above 70% of supply voltage or "zero", which is less than 30% of supply voltage and have largely supplanted analog systems or devices in all fields of computation and control due to their characteristics of unambiguity, accuracy, reliability, freedom from noise, flexibility, and versatility of design. The advent of solid state digital integrated circuits and solid state relays into the electronic field has furnished new components of greater reliability, safety, longer life, and greater versatility and have been utilized in the present invention.

The present invention takes advantage of these superior digital characteristics and employs level sensors which send D.C. digital sensing signals to a digital signal processing circuit which processes these signals according to state and sequence. The digital logic processing circuit output signal is used to actuate a solid state relay which can control either A.C. or D.C. power and which provides complete isolation of the sensing and logic circuits from the power line. The digital logic signal processing circuit inputs can be logic gates, for example, of very high resistance which enables sensing of direct current digital signals of a small fraction of a millionth of an ampere through conducting fluent material of very high resistance thus extending the scope of control to very high resistance types of material. Use of small currents, low D.C. voltages and small connecting wires to the sensors make the present invention suitable for use with battery power supply and remote sensing, an adaptability lacking in previous devices. The two level sensors of the present invention can be placed in any environment and need no conductive reservoir for operation. The present invention can be used with a large assortment of electrically conductive granular or fluent materials by the use of appropriately designed electrodes for the sensors. The present invention is further applicable to a large variety of electrically nonconductive and granular solid or opaque materials by the use of appropriately designed transducers used as sensors which are capable of delivering a D.C. logic signal "one" when immersed in the fluent material and a "zero" when out of the material.

SUMMARY OF THE INVENTION

The present invention is usefully applied on water wells, reservoirs, tanks, and fluid processes, for example. In the case of a well, a problem arises when the well is pumped dry and the pump inlet is exposed to air, as the pump may be damaged by dry operation or pumped sediment or may have to be primed before it will pump water again. The function of the present invention, and its usefulness, in this case, is the automatic prevention of the above undesired circumstances by turning OFF the pump before the water reaches an undesired low level and not turning it ON until a desired safe level is reached by the inflow to the well.

The simple sensor electrodes of the present invention, for example, sense the presence of water by its electrical conductivity, and may be the stripped metallic ends of two small insulated wire pairs suspended in the receptacle. One pair of ends, termed the lower sensor, is placed at a safe height above the pump intake, and the other pair of ends, termed the upper sensor, is placed at a desirable distance above the first pair. One of the "high" sensing electrodes is connected to a first input of a digital logic signal processing circuit termed "high", with the other electrode connected to the logic circuit voltage supply, so that upon electrode immersion in water, a positive voltage signal which is a digital "one" is applied to the "high" input of the logic circuit, while a zero voltage, or digital "zero" is applied when the electrodes are in air and thus insulated from each other. One of the "low" sensing electrodes is connected to a second input of the digital logic circuit termed "low", with the other electrode connected to the output of an OR Gate of the logic circuit, so that upon electrode immersion a "one" is applied to the "low" input upon condition that the OR Gate output is a "one", and a "zero" is applied to the "low" input when either the "low" sensing electrodes are in air, or the OR Gate output is a "zero". The OR Gate has two inputs termed "high" and "low", fed from the outputs of the "high" and "low" input circuits, which are in phase with their inputs, and gives an output "one" for a "one" at either of its two inputs. The "high" OR Gate input is a "one" if the high electrodes are immersed, and a "zero" if they are in air. The "low" OR Gate input may be a "one" only if the "high" OR Gate was already a "one", so that the OR Gate output "one" enables the "low" sensors to deliver a "one" to the "low" input, thus completing a positive feedback loop through the "low" logic input, "low" OR Gate input, OR Gate output, and the "low" sensing electrodes. The "one" at the "low" OR Gate input also actuates a solid state relay of the normally open type which closes the power circuit to the pump motor. The positive feedback loop through the OR Gate maintains an OR Gate output "one" when water falls below the "high" sensors. When the water level falls below the "low" sensors, a "zero" "low" sensor signal will result in a "zero" "low" OR Gate input and turning OFF of the pump motor, as the "high" sensors are already in the air and are also delivering a "zero". As the well inflow returns the level above the "low" sensors, they can only deliver a "zero" as the OR Gate output which energizes them is a "zero". When the water rises to cover the "high" sensing electrodes, they deliver a "one" and the "high" OR Gate input is a "one" so that the OR Gate output is a "one" and enables the "low" sensor which is immersed, to deliver a "one" to the "low" input, which results in a "one" at the "low" OR Gate input and also actuates the solid state relay to turn ON the pump motor. In this manner the pump is stopped at a safe low level and turned ON again at a desired higher level, and the present invention by its logic signal processing circuit furnishes a desirable dead band or hysteresis.

In the case of a tank being filled by a pump or through a valve, and where overflow of the tank is undesirable, the "high" sensor is placed at a desired high level, and the "low" sensor is placed at a desired low level. The same digital logic as previously described will deliver a "one" to the solid state relay when the high level is reached. The solid state relay in this case is of the normally closed type and the pump motor or valve is thus normally operative to fill the tank except when a "one" is delivered to the solid state relay to open its normally closed output circuit and turn OFF the pump motor or valve as a result of immersion of the "high" sensor, thus preventing overflow. When the level in the tank drops below the "low" sensor level, a "zero" is delivered to the solid state relay which returns to its normally closed state and turns ON the pump motor or valve to refill the tank again to the desired high level.

In the case of a tank being both emptied and supplied by pumps or through valves, the same logic circuit arrangement as previously described for a tank is employed, but with two solid state relays, one of the normally open, and the other the normally closed type. Both relays are simultaneously controlled by the logic output signals so that, at the low level, the pump or valve withdrawing from the tank is turned OFF as in a well, while the pump or valve feeding the tank is turned ON as in a tank. At the high level, the pump or valve supplying the tank is turned OFF, while the pump or valve withdrawing from the tank is turned ON.

As the input circuits of the logic gates of the present invention can be of very high resistance, in the order of hundreds of megohms if desired, sensors may be supplied a low D.C. voltage with resultant safety and with a very small voltage drop through the leads and sensing electrodes even though the resistance of the fluid might be in the megohm range. The power consumption of the logic signal processing circuit is also low, making battery supply feasible for use of the invention in remote areas. Long connecting wires of small diameters can conduct the small currents used. The logic signal processing circuit is preferably of integrated form, but may employ suitable discrete components or be a hybrid circuit of discrete and integrated circuit components. The solid state relalys are electronic circuits which can be actuated by the logic and can control either A.C. or D.C. power to pumps or valves. Solid state relays employ a digital input signal to excite a light emitting diode which is optically coupled to control the firing of a thyristor which controls the power.

In the case of nonconducting fluent material such as oil in an automobile crankcase, which is similar to the case at a well, suitable transducers which when immersed in the oil have a positive digital signal voltage output, and when in free air a zero output, can be used as sensors of the desired high and low levels of the fluent material, and can activate flow control means by use of the logic as previously described. A warning light may be actuated, or an oil reservoir valve opened to supply more oil, by a logic "zero" from the "low" sensor when oil level falls below this sensor, an undesirable condition. The warning light would be extinguished and the valve closed only when a safe high level of lubricant immersing the "high" sensor is reached. In the case of other nonconducting fluent materials which may be granular solid or opaque, light or infra-red radiation from a light emitting diode or L.E.D. can be cut off from a photocell or phototransistor detector by immersion of the optical path in the material, and a digital "one" transmitted, for example. Other types of transducers which transmit a digital "one" upon immersion in the fluent material and a digital "zero" when out of it, can be usefully employed.

Therefore, it is an object of the invention to provide an improved system for level control of fluent material.

Another object of the invention is to provide a simple, reliable, and economical all solid state electronic control system using a digital logic system that is applicable to fluid reservoirs and the like to maintain fluent material level between predetermined high and low levels.

Another object of the invention is to provide a fluent material level control system capable of use with either conducting or nonconducting fluent material.

Another object of the invention is to provide a fluent material level control system having an anti-hunt hysteresis or dead band.

Another object of the invention is to provide a fluid level control system adaptable to use in agriculture to maintain moisture levels in soil and the like, by use of suitable sensing electrodes.

Yet another object of the invention is to provide a fluent material level control system using low D.C. voltages and currents and thus enabling resultant safety to the user, utilization of battery supply, remote location of sensors, economical sensor wiring, and use in remote areas.

Still another object of the invention is to provide a fluent material level control system that can be used with nonconducting or opaque granular fluent material by use of suitable transducers for detecting material level.

These objects and features of the present invention and the construction of the invention can be understood from the accompanying drawings and the following written description.

DESCRIPTION OF PREFERRED EMBODIMENT

Figure 1:
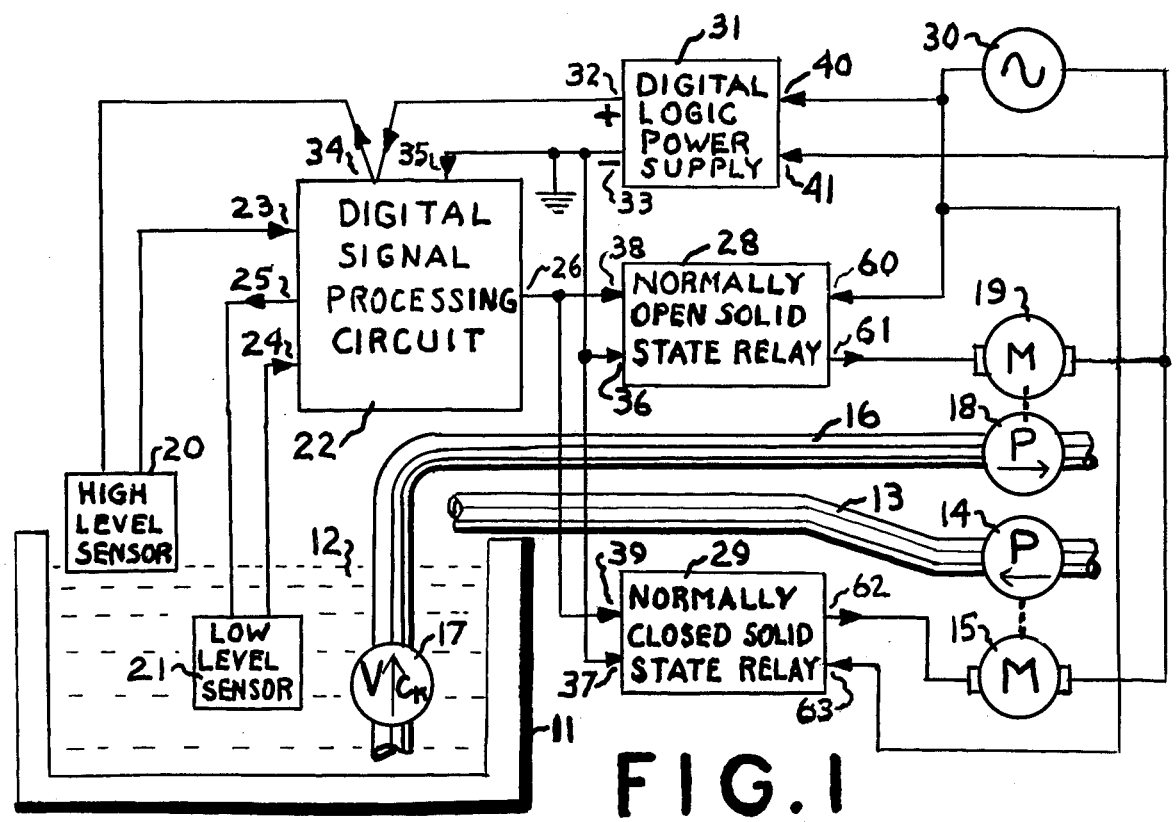
FIG. 1 is a block diagram of the present invention showing its use to control high and low level of fluent material in a reservoir, for example, thus preventing both dry pumping and overflow.

The system as shown in FIG. 1 includes all functions of the present invention and is shown in block diagram form, as used to maintain fluid within desired high and low levels while pumping from and pumping into a reservoir or other receptacle.

Referring to FIG. 1, a reservoir 11, for example, is shown filled with a fluid 12, which is pumped from a supply (not shown) into the reservoir 11 through a pipe 13 by a pump 14, driven by a motor 15. Power from a source 30 to the motor 15 is conducted through output terminals 62 and 63 of a normally closed solid state relay 29, which opens the circuit between the terminals 62 and 63 when actuated at an input terminal 39 by a digital "one" signal from the output terminal 26 of a digital signal processing circuit 22. The reservoir 11 can be emptied through a check valve 17 and a pipe 16 by a pump 18, driven by a motor 19. Power from a source 30 to the motor 19 is conducted through output terminals 60 and 61 of a normally open solid state relay 28, when the relay 28 is actuated at its input terminal 38 by a digital "one" signal at the output terminal 26 of the digital processing circuit 22. Inside the reservoir 11, at a suitable level above the inlet to the check valve 17, a low-level sensor 21 is placed, connected by wires to a "low" input terminal 24 and to an OR Gate output terminal 25 of the digital signal processing circuit 22. Also inside the reservoir 11, at a suitable level below the top of the reservoir 11 to prevent overflow, a high-level sensor 20 is placed, connected by wires to "high" input terminal 23 of the digital signal processing circuit 22 and to the positive supply terminal 34 of the digital logic signal processing circuit 22. Power supply output terminals 32 and 33 are respectively connected to power input terminals 34 and 35 of the digital signal processing circuit 22 to supply operational power to this circuit. Negative power supply output terminal 33 is grounded and connected to ground terminals 36 and 37 of respective relays 28 and 29. The output terminal 26 of the circuit 22 is connected to input terminals 38 and 39 of respective relays 28 and 29. Power supply 31 has its input terminals 40 and 41 connected to the power source 30. The operation of the system of FIG. 1 will be described later.

Figure 2:
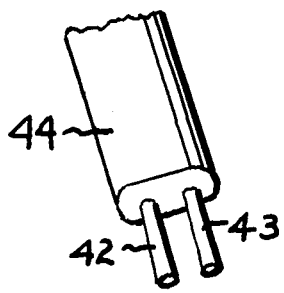
FIG. 2 is a perspective view of a fluid level sensor for use in noncorrosive, electrically conductive fluids such as water.

Referring to FIG. 2, a suitable sensor for water or similar noncorrosive conducting fluids is shown, and consists of the metallic bare ends of copper wires 42 and 43 extending approximately half an inch beyond the insulation 44 of a pair of wires used for connection to the circuit 22. This parallel type of wire pair is a product commonly known as zip cord, used for electrical wiring, or loud speaker wiring in audio installations, in #16 to #20 gauge, and is supplied with various suitable types of plastic insulation. The wire ends 42 and 43 serve as electrodes to contact the conducting fluid, and are not electrolized or harmed by the microampere range current passed between them.

Figure 3:
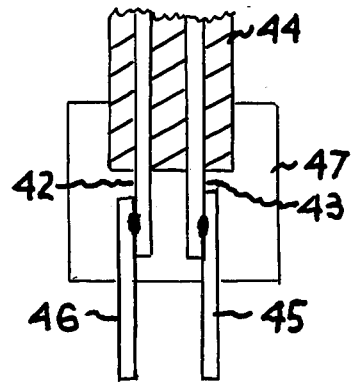
FIG. 3 is a cross-sectional view of a fluid level sensor for use in corrosive, electrically conductive fluids such as acid.

Referring to FIG. 3, a suitable sensor for corrosive fluids is shown, and consists of platinum wires 45 and 46 welded or brazed to copper wires 42 and 43, and extending beyond a suitable plastic protective casting 47 which encloses and protects the copper wires.

Figure 4:
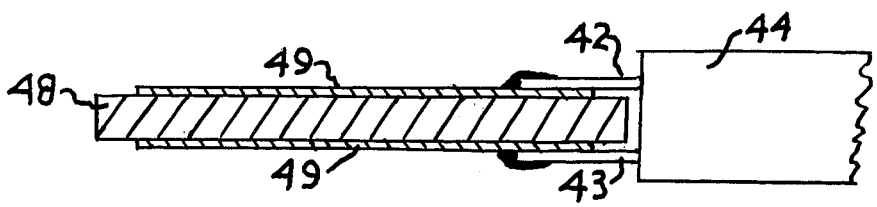
FIG. 4 is a cross-sectional view of a fluid level sensor for use in noncorrosive, granular, hygroscopic fluent material such as earth.

Referring to FIG. 4, a suitable sensor for conductive granular material such as earth is shown, and consists of a plastic insulating sheet 48 coated with a copper coating 49 on both sides, with copper wires 42 and 43 soldered to the copper coating 49. The area of the copper coating is made large enough to make a suitable contact with the earth, when buried. Two sensors of this type may be employed to control soil moisture in an automatic irrigation control system for agriculture.

Figure 5:
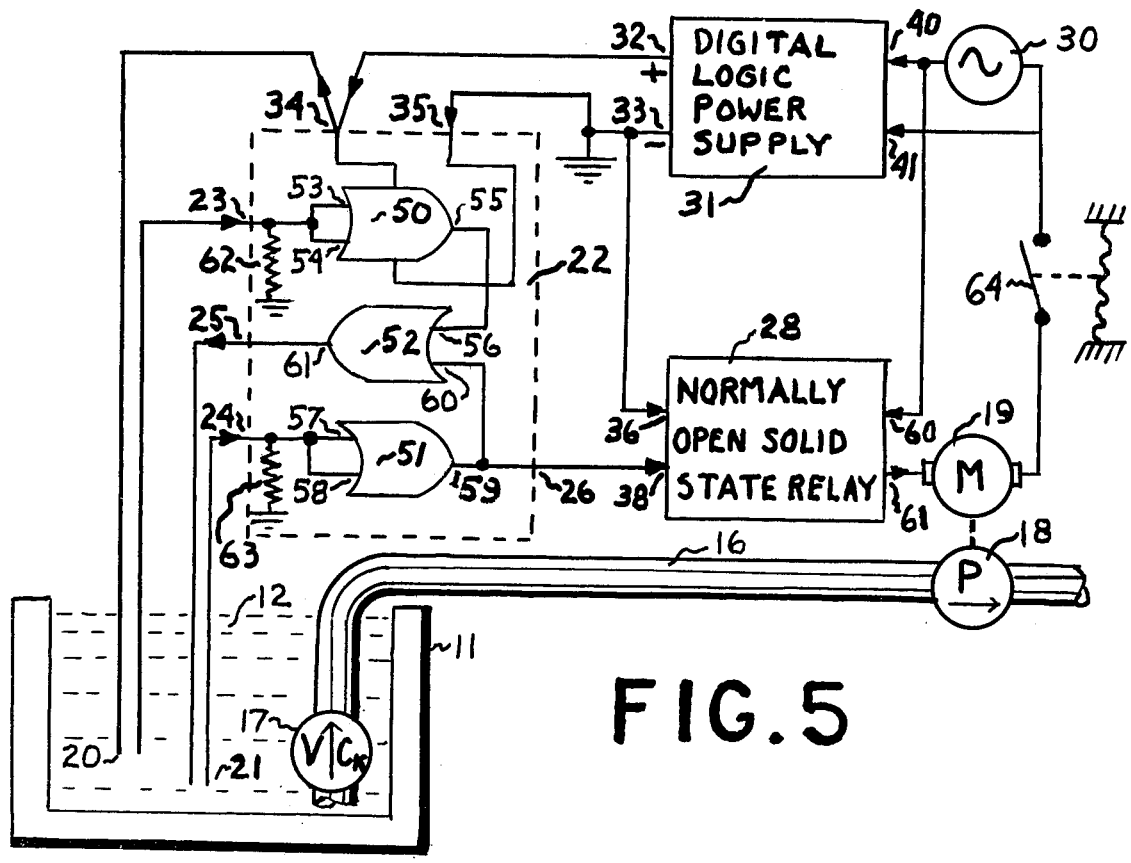
FIG. 5 is a schematic diagram showing the digital logic circuit elements comprising the digital signal processing circuit of the present invention, using level sensors as shown on FIG. 2, and other components in block form for a level control system for use in prevention of dry pumping, as in a water well.

Referring to FIG. 5, the invention is shown in an application to prevent dry pumping. A shallow resevoir 11 in the earth supplies water 12 through the check valve 17 and the pipe 16 by means of the pump 18, which is driven by the motor 19. The motor 19 is supplied from the power source 30 and is controlled by a prsssure switch 64 and by the normally open solid state relay 28. The low-level sensor 21, of the type described in FIG. 2, is connected to the terminals 24 and 25 of the digital signal processing circuit 22, and is located a short distance above the inlet of the check valve 17. The high-level sensor 20, of the type described in FIG. 2, is connected to terminals 23 and 34 of the digital signal processing circuit 22, and is located a few feet above the low sensor 21. The sensors may be suspended in the water and sufficiently weighted to definitely locate them. The digital signal processing circuit 22 is shown as a dotted line enclosure in FIG. 5, with its interior digital logic circuit elements shown by conventional logic symbols, and with the interconnections of these logic circuit elements shown. Referring to FIG. 5 and its dotted line enclosure of the circuit 22, a first input Gate 50 has its two input terminals 53 and 54 connected together and to the high sensor 20 signal input terminal 23, and has its output terminal 55 connected to an input terminal 56 of an OR Gate 52, while a second input Gate 51 has its two inputs 57 and 58 connected together and to the low sensor 21 signal input terminal 24 and has its output 59 connected to the input 60 of the OR Gate 52 and output terminal 26 of the signal processing circuit 22. Output 61 of the OR Gate 52 is connected to the first output terminal 25 of the signal processing circuit 22. The normally open solid state relay 28 is a conventional type and is shown in block form with its relay input terminals 38 and 36 connected respectively to the second output terminal 26 of the circuit 22 and ground as shown. Input terminals 23 and 24 of the circuit 22 are connected to ground through high resistances 62 and 63 which serve to prevent erratic operation of the gates 50 and 51 when the sensors 20 and 21 are open circuits. The power supply 31 has its output terminals 32 and 33 connected to terminals 34 and 35 of the signal processing circuit 22, and terminals 34 and 35 are connected internally to the power supply terminals of all the digital logic circuit elements, exemplified by the connections to the input gate 50. Input gates 50 and 51 are symbolically shown in FIG. 5 as dual input OR gates with their two inputs connected together thus making them into buffers with outputs in phase with inputs. The gate 52 is a dual input OR gate as shown. The digital logic of the circuit 22 is preferably implemented, for example, by suitable interconnections of logic elements contained in a quadruple dual input OR gate CMOS integrated circuit package commercially known as CD 4071.

In the operation of the device of FIG. 5, water is assumed to be flowing into the reservoir 11, which is the reservoir of a home water pressure system, from the surrounding earth strata, and has filled the reservoir to a level above the high sensor 20, thus making a conducting path between electrodes 42 and 43 of sensors 20 and 21. This conducting path has a resistance of 30,000 to 100,000 ohms in ordinary fresh well water. The input resistances 62 and 63 are preferably in the 0.5 megohm range, so that over 90% of the logic circuit supply voltage is present at the input terminal 23 and inputs 53 and 54 of input gate 50 driving the input gate 50 to a digital "one" output at its output 55 and connected input 56 of OR gate 52 driving gate 52 to a digital "one" voltage output at its output 61 and connected first output terminal 25 of circuit 22. The voltage at terminal 25 of circuit 22 is conducted through low sensor 21 by electrodes 42 and 43 and the water and is present at the input terminal 24 of circuit 22 and connected inputs 57 and 58 of gate 51 driving the input gate 51 to a digital "one" at its output 59, connected to second output terminal 26 of circuit 22 and also connected to input 60 of OR gate 52. The digital "one" output at terminal 26, connected to input terminal 38 of the relay 28, actuates the relay 28 closing the circuit between relay output terminals 60 and 61 and allowing the pump motor 19 to be turned ON by closure of the controlling pressure switch 64 when output water from the pump 18 is demanded by the water system. Assuming that switch 64 is closed and that pump motor 19 is driving pump 18, water is pumped from the well and the water level drops below high sensor 20, thus making a digital "zero", or zero voltage at input terminal 23 and inputs 53 and 54 of input gate 50 as the electrodes 42 and 43 of sensor 20 are insulated by air. Output 55 of gate 50 will then be zero, together with connected OR gate input 56, but this does not affect output of OR gate 52 which still delivers a "one" at its output terminal 61 as a result of the positive feedback loop of connected first output terminal 25, the immersed conducting electrodes 42 and 43 of low sensor 21, input terminal 24, inputs 57 and 58 of gate 51, output of gate 51, input 60 of OR gate 52 and still delivers a "one" at second output terminal 26 to drive relay 28. As water continues to be pumped, the level drops below the electrodes 42 and 43 of low sensor 21 removing the fluid conducting path and making a "zero" at terminal 24 and a "zero" at inputs 57 and 58 of input gate 51, its output 59 and input 60 of OR gate 52, turning OFF OR gate 52 and resulting in a "zero" at first output terminal 25, thus breaking the feedback loop and making a digital "zero" at output terminal 26 and connected input terminal 38 of relay 28. The "zero" at input terminal 38 of the relay 28 opens the circuit between relay output terminals 60 and 61 stopping the motor 19. The pump has thus been stopped before the water level has dropped below the intake of the valve 17, so that dry pumping has been avoided. As water flows into the well to re-fill it, and the level rises above the electrodes 42 and 43 of low sensor 21, zero voltage is still present at first output terminal 25, disabling sensor 21, and gate 51 still delivers a "zero" at its output 59 and terminal 26 of circuit 22 and input terminal 38 of relay 28 so that relay 28 output circuit terminals 60 and 61 remain open and pump 18 remains stopped. As the water level rises further and the electrodes 42 and 43 of high sensor 20 are immersed, a digital "one" is delivered to second output terminal 23 driving gate 50 to a digital "one" at its output 55 and connected OR gate input terminal 56, driving OR gate 52 to a "one" at OR gate 52 output 61 and first output terminal 25. The digital "one" voltage at first output terminal 25 is conducted through the electrodes 42 and 43 of the low sensor 21 by the water to input terminal 24 of circuit 22 and the inputs 57 and 58 of gate 51, driving gate 51 to a "one" at its output 50 and connected input 60 of OR gate 52 thus again closing the feedback loop through OR gate 52 and transmitting a "one" from second output terminal 26 of circuit 22 to the input terminal 38 of the relay 28, actuating relay 28 and closing the circuit through the relay output terminals 60 and 61 to deliver power to the motor 19 again for pumping the water which is now available.

It can be understood from the preceding paragraph that the present invention by means of the digital logic of the digital signal processing circuit 22 and the digital signals from the sensors 20 and 21 has provided automatic maintenance of a desired low level, control of pumping flow preventing dry pumping, and a delayed resumption of pumping which provides a desirable dead band or hysteresis.

Figure 6:
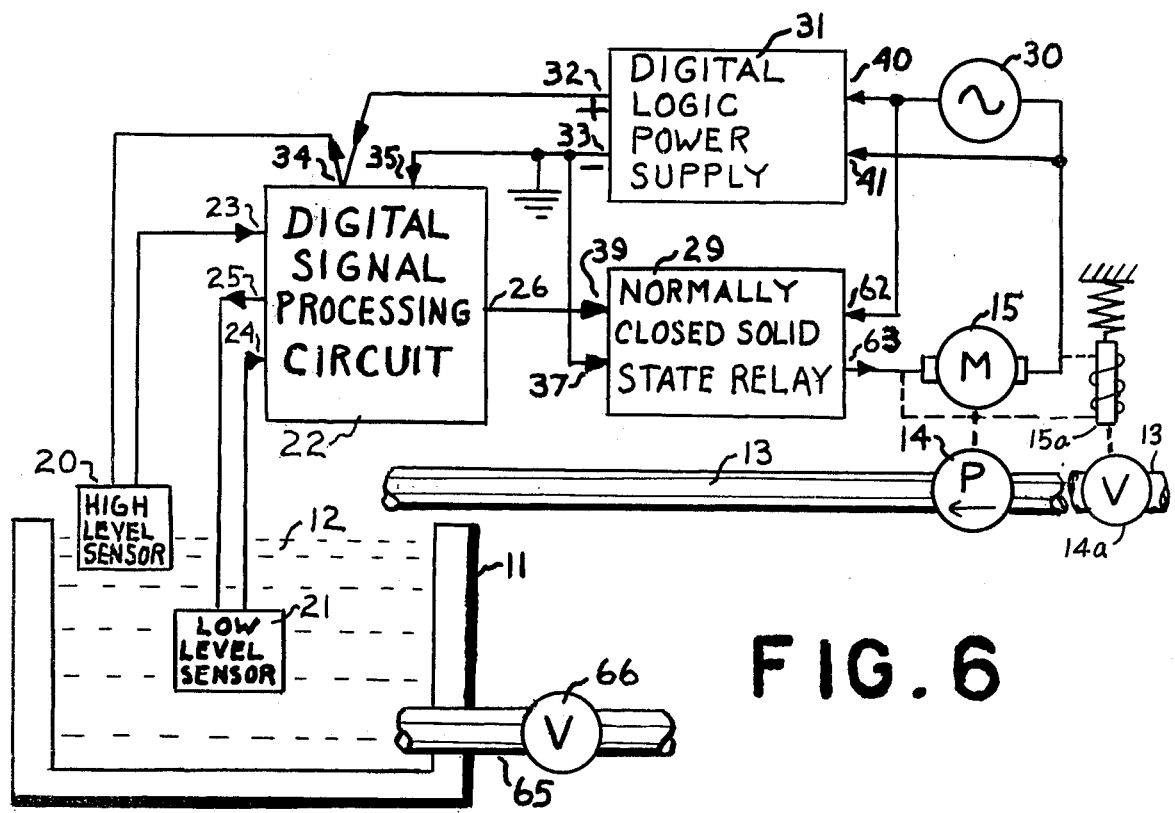
FIG. 6 is a block diagram showing the present invention as used in a system to prevent tank overflow.

In another application of the present invention, overflow of a reservoir or tank may be prevented. The sensors 20 and 21 are placed at desired levels, with high level sensor 20 just below the overflow level. Referring to FIG. 6, the reservoir 11 is being filled with fluid 12 through the pipe 13 by the pump 14 which is driven by the motor 15. A pipe 65 drains fluid from the reservoir 11 when a valve 66 is opened. Power from the source 30 to the motor 15 is controlled by serially connected output terminals 62 and 63 of normally closed solid state relay 29. The input terminal 39 of the relay 29 is connected to the output terminal 26 of the signal processing circuit 22, which operates together with sensors 20 and 21 in the same manner as previously described in the device of FIG. 5, a digital output "one" appearing at the terminal 26 of the circuit 22 when the high sensor electrodes are immersed. In the system of FIG. 6, the pump motor 15 is energized by the normally closed circuit between output terminals 62 and 63 of the solid state relay 29 to pump fluid into the reservoir 11, filling it to the level of the high sensor 20, making a "one" at the input terminal 23 of the circuit 22, a "one" at the output terminal 26 of the circuit 22, and a "one" at the input terminal 39 of the relay 29 opening the normally closed circuit between the output terminals 62 and 63 of relay 29 thus stopping the pump motor 15 and preventing overflow of the tank. As fluid is withdrawn from the tank through the pipe 65 by opening the valve 66, and the fluid level drops below the low sensor 21 making a "zero" at the input terminal 24 of the circuit 22, resulting in a "zero" at the output terminal 26 and the input terminal 39 of the relay 29 returning the relay 29 to its normally closed state and closing the circuit between the relay output terminals 62 and 63 thus starting the pump motor to refill the reservoir. If the fluid supply is under pressure in the system of FIG. 6, closing of the circuit between the relay output terminals 62 and 63 can actuate the connected solenoid 15a of a normally spring closed conventional electrically actuated valve 14a placed in pipe 13 instead of pump 14. The solenoid takes the place of the motor 15 shown in the circuit of FIG. 6, and when actuated by normally closed relay 29, opens the valve to permit flow of fluid into reservoir 11 from the pressurized fluid supply. Opening of the circuit between output terminals 62 and 63 de-activates the solenoid and allows the spring to return the valve 14a to its normally closed position and stop the flow through pipe 13 and prevent overflow of the reservoir 11.

The invention as shown in block diagram form in FIG. 1 operates in similar manner as described in FIGS. 5 and 6 to maintain both high and low fluid level in a reservoir while filling and emptying the reservoir, by using the digital signals sent by high and low sensors 20 and 21 to the digital logic signal processing circuit 22 to control the relays 28 and 29 simultaneously by the digital output signal from the terminal 26 of the circuit 22 and operate flow control means maintaining the desired level in the manner previously described for the systems of FIGS. 5 and 6.

The present invention also can be applied to the level control of fluent material that is granular, opaque, or nonconducting by use of suitable transducers used as the level sensors, as shown in the block diagram of FIG. 1. These transducers, acting to sense levels of material, must be capable of transmitting a digital "one" signal to the signal processing circuit 22 when immersed in the fluent material to be controlled, and a digital "zero" when out of the fluent material. These digital signals are processed in the circuit 22 as previously described, and the output of the circuit 22 can operate solid state relays and flow control means for the level control of the fluent materials.

While the preferred embodiment of the invention has been described, the form of the invention described should be considered as illustrative and not as limiting the scope of the following claims.

I claim:

1. The method of controlling the level of fluent material in a reservoir and maintaining said level between desired high and low levels in said reservoir, which comprises:

detecting increasing or decreasing levels of fluent material by placing upper and lower level sensors at said desired levels, said sensors individually transmitting a digital signal voltage upon immersion in said material and terminating said digital output signal upon emergence from said material;

transmitting said digital voltage signals from said sensors to first and second input terminals of a digital signal processing circuit including digital logic gates, said circuit being energized by a connected power supply and having first and second output terminals;

processing said digital signals from said sensors in said processing circuit in a manner to transmit a digital signal voltage to said first and second output terminals of said processing circuit when a digital signal voltage is received at both said first and said second input terminals, to maintain said digital signal voltage at said first and said second output terminals after a digital "zero" signal voltage appears at said first input terminal, and to transmit a digital "zero" signal voltage to said first and said second output terminals after a digital "zero" voltage is received at said second input terminal;

transmitting said digital voltage output signal from said second output terminal of said processing circuit to the input circuit of a solid state relay having an input circuit and an output circuit, said relay output circuit being serially connected between a source of electrical power and power driven flow control means, said relay input circuit responding to said output digital signal from said processing circuit and changing the operating state of said output circuit of said relay;

operating flow control means by said change of state of said relay output circuit; and controlling flow of said material in piping connected to said reservoir to maintain level of said material within said desired levels in said reservoir.

2. a. A reservoir containing a fluent material;
   b. electrically powered flow control means operable to control flow of said material in piping connected to said reservoir;
   c. digital signal processing circuit means having first and second input terminals and first and second output terminals, said circuit being energized with digital operating voltage and including digital logic gates operable to transmit a digital voltage signal from said second output terminal when receiving a digital voltage signal at said second input terminal;
   d. level sensor means placed at upper and lower levels in said reservoir, said upper level sensor means being connected to receive said digital operating voltage and operable to internally transmit said voltage through said sensor as a digital voltage signal to the connected said first input terminal of said processing circuit when said sensor is immersed in said material, said upper level sensor operable to cease said transmission of said digital voltage signal when out of said material, said lower level sensor means being connected to receive said digital voltage signal from said first output terminal of said processing circuit after said upper level sensor is immersed in said material and said lower level sensor operable to internally transmit said digital voltage signal through said lower level sensor to the connected said second input terminal of said processing circuit when immersed in said material, and said lower level sensor operable to cease said transmission of said digital voltage signal when out of said material;
   e. solid state electrical power control means having an input circuit and an output circuit, said input circuit connected to receive said digital voltage signal from said second output terminal of said processing circuit and operable to change the state of said output circuit to control electrical power to said flow control means thereby controlling levels of said material in said reservoir.

3. The system of claim 2 wherein said material is electrically conductive and each of said sensors comprises two spaced electrodes exposed for immersion in said material, said electrodes operably connected to transmit a digital voltage signal upon immersion in said material.

4. The system of claim 2 wherein said digital signal processing circuit includes a digital logic circuit supplied with operating voltage and further comprising:

a first gate having a high impedance input circuit and an in-phase output circuit, said input circuit operably connected to said upper sensor;

a connection from said operating voltage to said upper sensor enabling said upper sensor to transmit a digital voltage signal when immersed in said material;

a second gate having a high impedance input circuit and an in-phase output circuit, said input circuit operably connected to said lower sensor;

a digital logic OR gate having an output circuit and two input circuits, said input circuits operably connected to said output circuits of said first gate and said second gate;

a connection from said output circuit of said OR gate to said lower sensor transmitting a digital votage signal from said output of said OR gate to said lower sensor enabling said sensor to transmit a digital signal when immersed in said material; and a connection from said output circuit of said second gate for delivering an output signal from said digital processing circuit, said digital logic circuit operating to deliver said output signal only when the level of said material rises to immerse said upper sensor and terminating said output signal from said processing circuit only when the level of said material falls below said lower sensor.

5. The system of claim 1 wherein said flow control means includes an electrically actuated pump for pumping said material through piping connecting to said reservoir.

6. The system of claim 1 wherein said flow control means includes an electrically actuated valve for controlling the flow of said material through piping connecting to said reservoir.

* * * * *